(12) United States Patent
Rocholl et al.

(10) Patent No.: US 11,338,995 B2
(45) Date of Patent: May 24, 2022

(54) EXTENDABLE LIFT ARM ASSEMBLY FOR A FRONT END LOADING REFUSE VEHICLE

(71) Applicant: Oshkosh Corporation, Oshkosh, WI (US)

(72) Inventors: Joshua D. Rocholl, Rochester, MN (US); Matt Deinema, Oshkosh, WI (US); Jarud H. Hoefker, Dodge Center, MN (US); Justin Wilmes, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 41 days.

(21) Appl. No.: 17/013,041

(22) Filed: Sep. 4, 2020

(65) Prior Publication Data

US 2020/0399058 A1 Dec. 24, 2020

Related U.S. Application Data

(63) Continuation of application No. 16/227,901, filed on Dec. 20, 2018, now Pat. No. 10,800,605.
(Continued)

(51) Int. Cl.
*B65F 3/04* (2006.01)
*B60P 1/50* (2006.01)
*B65F 3/02* (2006.01)

(52) U.S. Cl.
CPC ............... *B65F 3/041* (2013.01); *B60P 1/50* (2013.01); *B65F 3/046* (2013.01);
(Continued)

(58) Field of Classification Search
CPC .... B65F 3/046; B65F 3/041; B65F 2003/025; B65F 2003/0276; B65F 2003/0279; B60P 1/50
See application file for complete search history.

(56) References Cited

U.S. PATENT DOCUMENTS 3,207,344 A * 9/1965 Clar .......................... B65F 3/04
414/409
3,338,438 A 8/1967 Holtkamp
(Continued)

FOREIGN PATENT DOCUMENTS

DE 44 06 806 A1 9/1995
IT MI20130846 A1 11/2014

OTHER PUBLICATIONS

International Search Report and Written Opinion Received for Application No. PCT/US2018/066804, dated Apr. 18, 2019, 13 pages.
(Continued)

*Primary Examiner* — Saul Rodriguez
*Assistant Examiner* — Willie Berry, Jr.
(74) *Attorney, Agent, or Firm* — Foley & Lardner LLP

(57) ABSTRACT

A vehicle includes a chassis, a body coupled to the chassis, and a lift assembly coupled to at least one of the chassis or the body. The lift assembly includes a first lift arm and a second lift arm. The first lift arm includes a first arm portion, a second arm portion interfacing with the first arm portion, a first actuator positioned to facilitate repositioning the second arm portion relative to the first arm portion, and a second actuator positioned to pivot the first arm portion. The second lift arm includes a third arm portion, a fourth arm portion interfacing with the third arm portion, a third actuator positioned to facilitate repositioning the fourth arm portion relative to the third arm portion, and a fourth actuator positioned to pivot the second arm portion.

16 Claims, 4 Drawing Sheets

Related U.S. Application Data

(60) Provisional application No. 62/609,076, filed on Dec. 21, 2017.

(52) U.S. Cl.
CPC . *B65F 2003/025* (2013.01); *B65F 2003/0276* (2013.01); *B65F 2003/0279* (2013.01)

(56) References Cited

U.S. PATENT DOCUMENTS

| | | | |
|---|---|---|---|
| 3,730,365 A | 5/1973 | Herpich et al. | |
| 3,765,554 A | 10/1973 | Morrison | |
| 4,175,903 A | 11/1979 | Carson | |
| 4,306,832 A | 12/1981 | Schmiesing | |
| 4,854,406 A * | 8/1989 | Appleton | B65F 3/04 |
| | | | 177/139 |
| 4,854,811 A | 8/1989 | Veys | |
| 4,999,022 A | 3/1991 | Veys | |
| 5,033,930 A | 7/1991 | Kraus | |
| 5,088,213 A | 2/1992 | Raimondo et al. | |
| 5,330,308 A | 7/1994 | Armando et al. | |
| 5,697,741 A | 12/1997 | Harris et al. | |
| 5,725,348 A | 3/1998 | Drake | |
| 5,779,300 A | 7/1998 | McNeilus et al. | |
| 5,829,946 A | 11/1998 | McNeilus et al. | |
| 5,931,628 A | 8/1999 | Christenson | |
| 6,290,450 B1 | 9/2001 | Humphries et al. | |
| 6,474,928 B1 | 11/2002 | Christenson | |
| 6,485,079 B1 | 11/2002 | Brown et al. | |
| 6,527,495 B2 | 3/2003 | Humphries et al. | |
| 6,666,491 B2 | 12/2003 | Schrafel | |
| 6,918,721 B2 | 7/2005 | Venton-Walters et al. | |
| 6,997,506 B2 | 2/2006 | Hecker | |
| 7,055,880 B2 | 6/2006 | Archer | |
| 7,073,847 B2 | 7/2006 | Morrow et al. | |
| 7,118,314 B2 | 10/2006 | Zhou et al. | |
| 7,264,305 B2 | 9/2007 | Kuriakose | |
| 7,370,904 B2 | 5/2008 | Wood et al. | |
| 7,517,005 B2 | 4/2009 | Kuriakose | |
| 7,621,580 B2 | 11/2009 | Randjelovic et al. | |
| 7,823,948 B2 | 11/2010 | Redman et al. | |
| 7,954,882 B2 | 6/2011 | Brummel et al. | |
| 8,152,216 B2 | 4/2012 | Howell et al. | |
| 8,182,194 B2 | 5/2012 | Pruteanu et al. | |
| 8,376,439 B2 | 2/2013 | Kuriakose et al. | |
| 8,573,914 B1 | 11/2013 | Strange | |
| 8,794,886 B1 | 8/2014 | Nett et al. | |
| 8,967,699 B1 | 3/2015 | Richmond et al. | |
| 8,998,555 B1 | 4/2015 | Ingham | |
| 9,174,686 B1 | 11/2015 | Messina et al. | |
| 9,187,242 B1 | 11/2015 | Strange | |
| 9,366,507 B1 | 6/2016 | Richmond et al. | |
| 9,387,985 B2 | 7/2016 | Gillmore et al. | |
| 9,493,093 B2 | 11/2016 | Stingle et al. | |
| 9,579,969 B2 | 2/2017 | Crist et al. | |
| 9,707,869 B1 | 7/2017 | Messina et al. | |
| 9,738,186 B2 | 8/2017 | Krueger et al. | |
| 9,845,191 B2 | 12/2017 | Schwartz et al. | |
| 10,035,648 B2 | 7/2018 | Haddick et al. | |
| 10,106,032 B2 | 10/2018 | Crist et al. | |
| 2017/0362030 A1 | 12/2017 | Steimel | |
| 2018/0334324 A1 | 11/2018 | Haddick et al. | |
| 2019/0047413 A1 | 2/2019 | Crist et al. | |

OTHER PUBLICATIONS

Heil, Half/Pack with Freightliner EconicSD, product images available as of at least Nov. 2020, retrieved from the internet at: https://show.doveresg.com/products/half-pack-econic/, 5 pages.

* cited by examiner

EXTENDABLE LIFT ARM ASSEMBLY FOR A FRONT END LOADING REFUSE VEHICLE

CROSS-REFERENCE TO RELATED PATENT APPLICATIONS

This application is a continuation of U.S. patent application Ser. No. 16/227,901, filed Dec. 20, 2018, which claims the benefit of U.S. Provisional Application No. 62/609,076, filed Dec. 21, 2017, both of which are incorporated herein by reference in their entireties.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One embodiment relates to a refuse vehicle. The refuse vehicle includes a chassis, a body coupled to the chassis, and a lift assembly. The lift assembly includes a first lift arm, a second lift arm, a first actuator, and a second actuator. The first lift arm includes (a) a first arm portion having (i) a first pivot end pivotally coupled to the body and (ii) a first interface end and (b) a second arm portion having (i) a second interface end that interfaces with the first interface end of the first arm portion and (ii) a first implement end configured to interface with an implement. The second lift arm includes (a) a third arm portion having (i) a second pivot end pivotally coupled to the body and (ii) a third interface end and (b) a fourth arm portion having (i) a fourth interface end that interfaces with the third interface end of the third arm portion and (ii) a second implement end configured to interface with the implement. The first actuator is positioned to facilitate repositioning the second arm portion relative to the first arm portion. The second actuator is positioned to facilitate repositioning the fourth arm portion relative to the third arm portion.

Another embodiment relates to a lift assembly for a vehicle. The lift assembly includes a first lift arm, a second lift arm, a first actuator, and a second actuator. The first lift arm includes (a) a first arm portion having (i) a first pivot end and (ii) a first interface end and (b) a second arm portion having (i) a second interface end that interfaces with the first interface end of the first arm portion and (ii) a first implement end. The second lift arm includes (a) a third arm portion having (i) a second pivot end and (ii) a third interface end and (b) a fourth arm portion having (i) a fourth interface end that interfaces with the third interface end of the third arm portion and (ii) a second implement end. The first actuator is positioned to facilitate repositioning the second arm portion of the first lift arm relative to the first arm portion of the first lift arm. The second actuator is positioned to facilitate repositioning the fourth arm portion of the second lift arm relative to the third arm portion of the second lift arm.

Still another embodiment relates to a vehicle. The vehicle includes a chassis, a body coupled to the chassis, and a lift assembly coupled to at least one of the chassis or the body. The lift assembly includes a first lift arm and a second lift arm. The first lift arm includes a first arm portion, a second arm portion interfacing with the first arm portion, a first actuator positioned to facilitate repositioning the second arm portion relative to the first arm portion, and a second actuator positioned to pivot the first arm portion. The second lift arm includes a third arm portion, a fourth arm portion interfacing with the third arm portion, a third actuator positioned to facilitate repositioning the fourth arm portion relative to the third arm portion, and a fourth actuator positioned to pivot the second arm portion.

The invention is capable of other embodiments and of being carried out in various ways. Alternative exemplary embodiments relate to other features and combinations of features as may be recited in the claims.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, an extendable lift arm assembly (e.g., a telescoping lift arm assembly, etc.) for a vehicle (e.g., a front end loading refuse vehicle, a refuse truck, etc.) includes a pair of two-piece lift arms configured to be pivotally coupled to the vehicle. Each of the lift arms include a first arm portion slidably coupled to a second arm portion. The second arm portion is extended relative to the first arm portion with an actuator. In one embodiment, the actuator extends between the first arm portion and the second arm portion. The extendable lift arm assembly (e.g., extension of the actuator, movement of the second arm portion relative to the first arm portion, etc.) may facilitate engaging a refuse container with the implement without needing to move the vehicle forward (e.g., the extendable lift arm assembly provides additional reach, etc.). The extendable lift arm assembly may additionally or alternatively provide clearance around more chassis configurations (e.g., conventional cabs, larger cabs, etc.). The extendable lift arm assembly may additionally or alternatively facilitate utilizing a conventional chassis, reducing the cost of the vehicle. The extendable lift arm assembly may additionally or alternatively facilitate accommodating cabs of different shapes (e.g., heights, etc.) as the lift arm assembly may be extended (e.g., automatically, etc.) to clear the cab (e.g., an upper trailing edge thereof, an upper leading edge thereof, etc.) and thereafter retracted to reduce the overall envelope of the vehicle.

Figure 1:
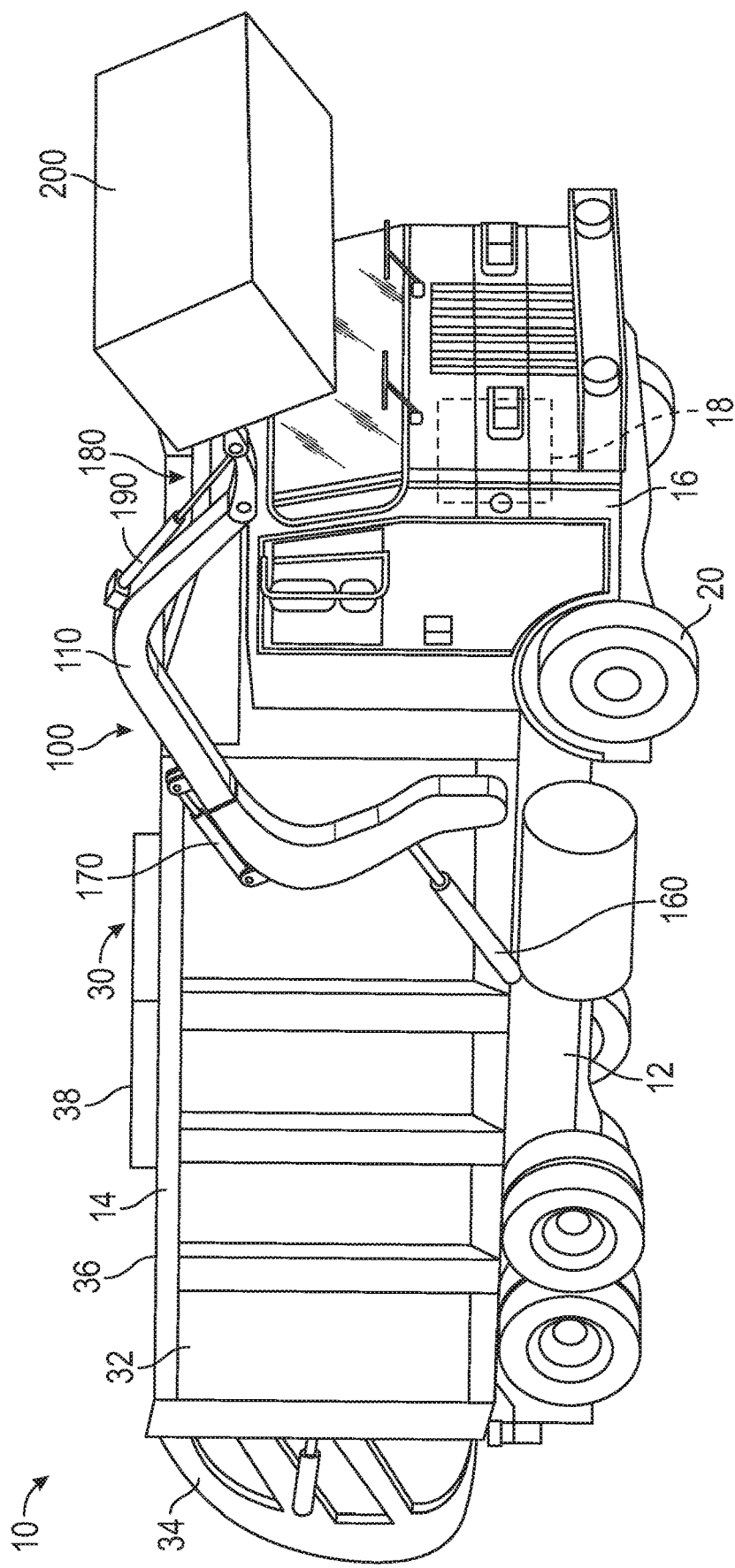
FIG. 1 is a perspective view of a refuse vehicle, according to an exemplary embodiment.

According to the exemplary embodiment shown in FIGS. 1-4, a front end loader, shown as refuse vehicle 10 (e.g., a garbage truck, a waste collection truck, a sanitation truck, etc.), is configured as a front-loading refuse truck having an extendable lift arm assembly, shown as telescoping lift arm assembly 100. In other embodiments, the refuse vehicle 10 is configured as a side-loading refuse truck or a rear-loading refuse truck. In still other embodiments, the front end loader is another type of vehicle (e.g., a skid-loader, a telehandler, a plow truck, a boom lift, a construction vehicle, etc.). As shown in FIG. 1, the refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The cab 16 may include various components to facilitate operation of the refuse vehicle 10 by an operator (e.g., a seat, a steering wheel, hydraulic controls, a user interface, switches, buttons, dials, etc.). As shown in FIG. 1, the refuse vehicle 10 includes a prime mover, shown as engine 18, coupled to the frame 12 at a position beneath the cab 16. The engine 18 is configured to provide power to a plurality of tractive elements, shown as wheel and tire assemblies 20, and/or to other systems of the refuse vehicle 10 (e.g., a pneumatic system, a hydraulic system, etc.). In other embodiments, the tractive elements include track elements. The engine 18 may be configured to utilize one or more of a variety of fuels (e.g., gasoline, diesel, bio-diesel, ethanol, natural gas, etc.), according to various exemplary embodiments. According to an alternative embodiment, the engine 18 additionally or alternatively includes one or more electric motors coupled to the frame 12 (e.g., a hybrid refuse vehicle, an electric refuse vehicle, etc.). The electric motors may consume electrical power from an on-board storage device (e.g., batteries, ultra-capacitors, etc.), from an on-board generator (e.g., an internal combustion engine, etc.), and/or from an external power source (e.g., overhead power lines, etc.) and provide power to the systems of the refuse vehicle 10.

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 includes a plurality of panels, shown as panels 32, a tailgate 34, and a cover 36. The panels 32, the tailgate 34, and the cover 36 define a collection chamber (e.g., hopper, etc.), shown as refuse compartment 30. Loose refuse may be placed into the refuse compartment 30 where it may thereafter be compacted. The refuse compartment 30 may provide temporary storage for refuse during transport to a waste disposal site and/or a recycling facility. In some embodiments, at least a portion of the body 14 and the refuse compartment 30 extend in front of the cab 16. According to the embodiment shown in FIG. 1, the body 14 and the refuse compartment 30 are positioned behind the cab 16. In some embodiments, the refuse compartment 30 includes a hopper volume and a storage volume. Refuse may be initially loaded into the hopper volume and thereafter compacted into the storage volume. According to an exemplary embodiment, the hopper volume is positioned between the storage volume and the cab 16 (i.e., refuse is loaded into a position of the refuse compartment 30 behind the cab 16 and stored in a position further toward the rear of the refuse compartment 30). In other embodiments, the storage volume is positioned between the hopper volume and the cab 16 (e.g., a rear-loading refuse vehicle, etc.).

As shown in FIGS. 1-4, the telescoping lift arm assembly 100 includes a first lift arm, shown as right lift arm 110, coupled to a first side of the body 14 and/or the frame 12, and a second lift arm, shown as left lift arm 112, coupled to an opposing second side of the body 14 and/or the frame 12 such that the right lift arm 110 and the left lift arm 112 extend forward of the cab 16 (e.g., a front-loading refuse vehicle, etc.). In other embodiments, the telescoping lift arm assembly 100 extends rearward of the body 14 (e.g., a rear-loading refuse vehicle, etc.). In still other embodiments, the telescoping lift arm assembly 100 extends from a side of the body 14 (e.g., a side-loading refuse vehicle, etc.). It should be noted that the description of the left lift arm 112 provided herein with regards to FIGS. 2-4 similarly applies to the right lift arm 110.

Figure 2:
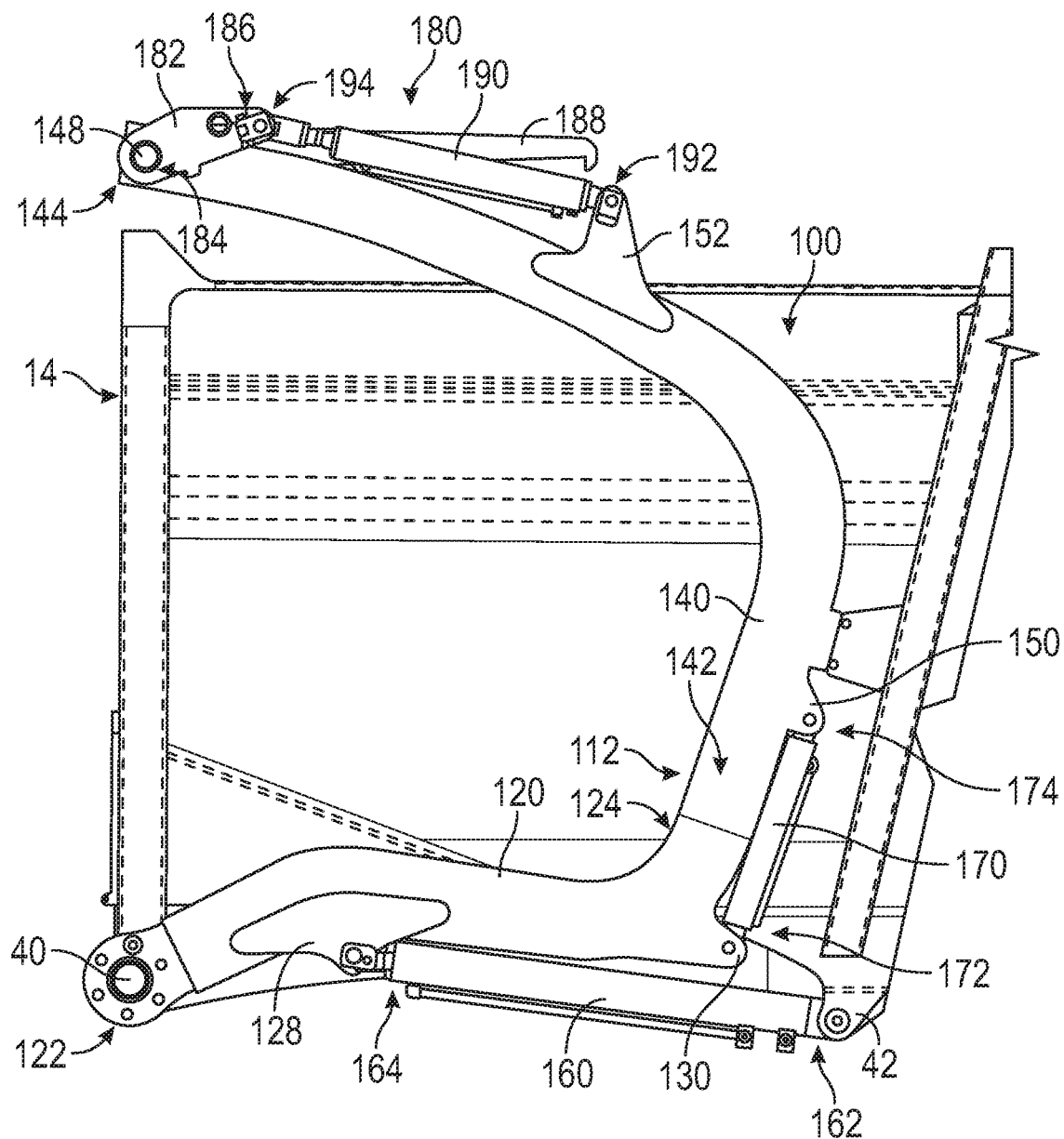
FIG. 2 is side view of an extendable lift arm assembly in a stowed position, according to an exemplary embodiment.
Figure 3:
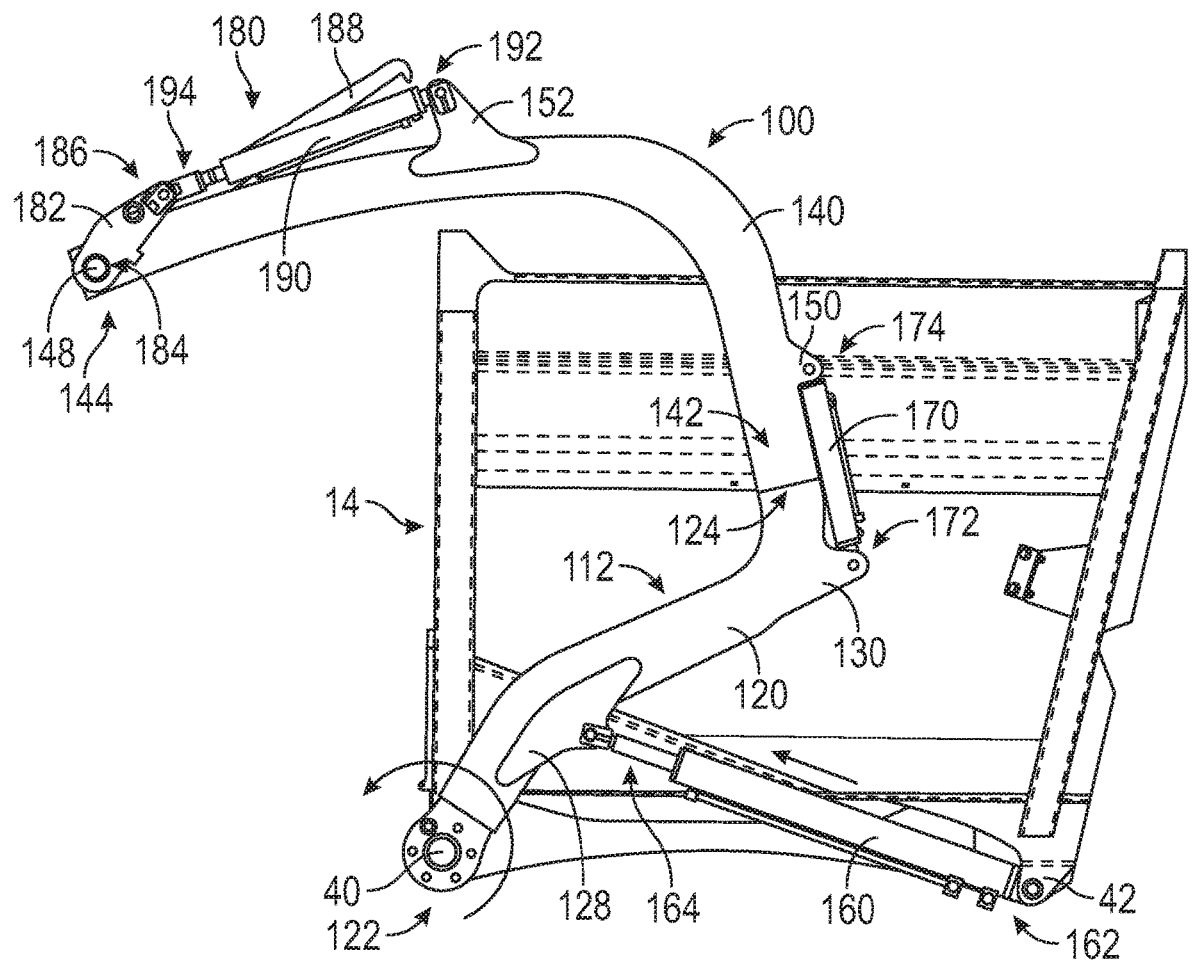
FIG. 3 is a side view of the extendable lift arm assembly of FIG. 2 in an intermediate position, according to an exemplary embodiment.
Figure 4:
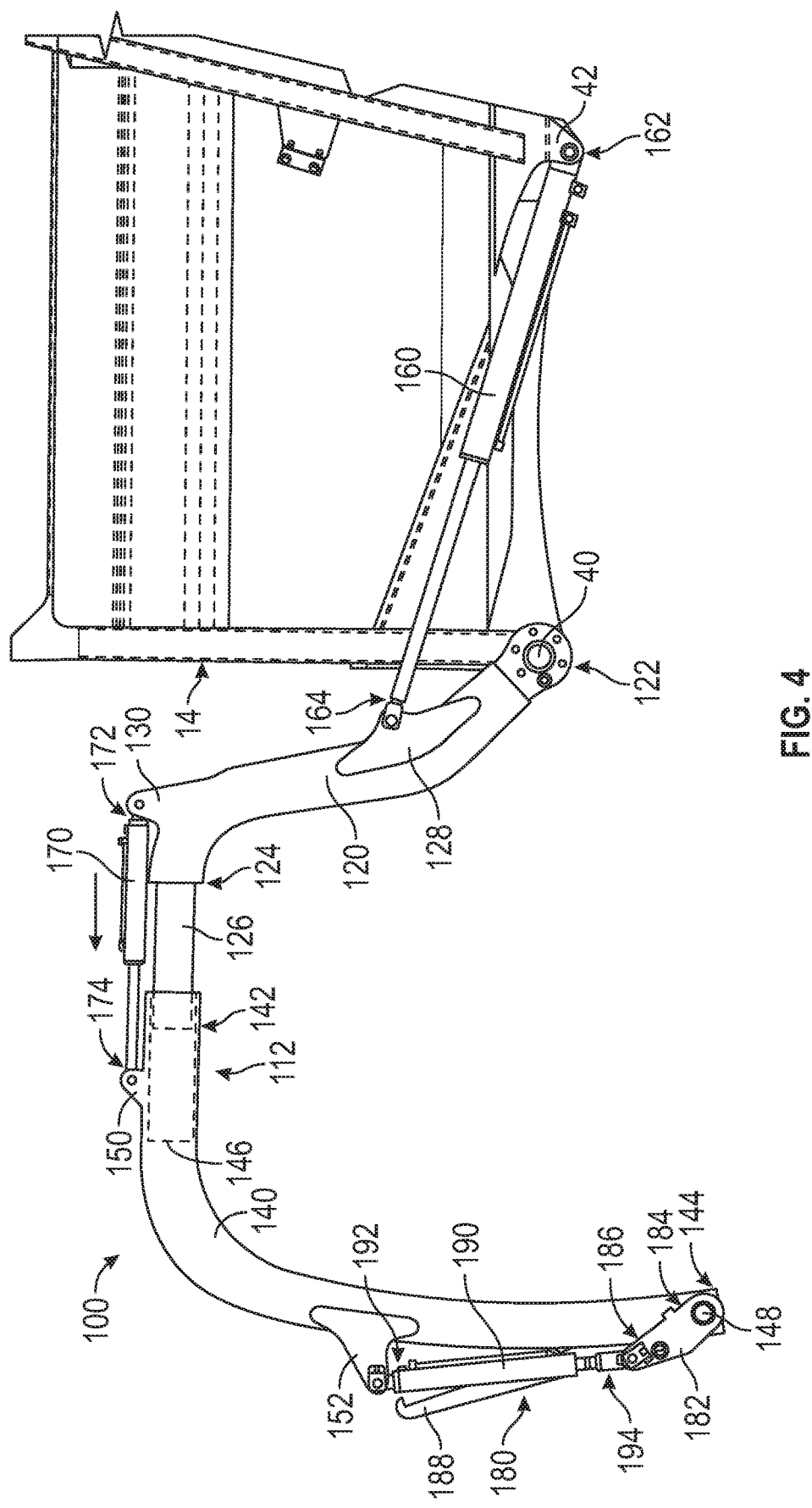
FIG. 4 is a side view of the extendable lift arm assembly of FIG. 2 in an extended working position, according to an exemplary embodiment.

As shown in FIGS. 2-4, the left lift arm 112 (and similarly the right lift arm 110) includes a first arm portion, shown as first arm portion 120, and a second arm portion, shown as second arm portion 140. The first arm portion 120 has a first end, shown as first end 122, pivotally coupled to a side (e.g., the left side, the right side, etc.) of the body 14 and/or the frame 12 at a first pivot point, shown as lift arm pivot 40, and an opposing second end, shown as second end 124. As show in FIG. 4, the second end 124 has a protrusion, shown as projection 126, extending therefrom. As shown in FIGS. 2-4, the first arm portion 120 includes (i) a first coupler, shown as first bracket 128, coupled along the first arm portion 120 between the first end 122 and the second end 124 (e.g., closer to the first end 122, proximate the first end 122, etc.), and (ii) a second coupler, shown as first flange 130, extending from the first arm portion 120, proximate the second end 124.

As shown in FIGS. 2-4, the second arm portion 140 has a first end, shown as first end 142, and an opposing second end, shown as second end 144. As show in FIG. 4, the first end 142 defines a cavity, shown as extension cavity 146, positioned to slidably receive the projection 126 of the first arm portion 120 (e.g., forming a telescoping assembly, etc.). In other embodiments, the second end 124 of the first arm portion 120 defines the extension cavity 146 and the first end 142 of the second arm portion 140 has the projection 126. As shown in FIGS. 2-4, the second arm portion 140 includes (i) a third coupler, shown as second flange 150, extending from the second arm portion 140, proximate the first end 142, and (ii) a fourth coupler, shown as second bracket 152, coupled along the second arm portion 140 between the first end 142 and the second end 144.

As shown in FIGS. 1-4, the telescoping lift arm assembly 100 includes a pair of first actuators (e.g., hydraulic cylinders, pneumatic actuators, electric actuators, etc.), shown as pivot actuators 160, a pair of extension actuators (e.g., hydraulic cylinders, pneumatic actuators, electric actuators, etc.), shown as extension actuators 170, an implement, shown as fork assembly 180, and a pair of third actuators (e.g., hydraulic cylinders, pneumatic actuators, electric actuators, etc.), shown as implement actuators 190. As shown in FIGS. 2-4, each of the pivot actuators 160 includes a first end, shown as first end 162, pivotally coupled to a side of the body 14 and/or the frame 12 at a second pivot point, shown as pivot actuator pivot 42, and an opposing second end, shown as second end 164, coupled to the first bracket 128 of the first arm portion 120. According to an exemplary embodiment, the pivot actuators 160 are positioned such that extension and retraction thereof pivots the right lift arm 110 and the left lift arm 112 about the lift arm pivot 40 between a stowed position, as shown in FIG. 2, and a working position, as shown in FIG. 4.

As shown in FIGS. 2-4, each of the extension actuators 170 includes a first end, shown as first end 172, coupled to the first flange 130 of the first arm portion 120, and an opposing second end, shown as second end 174, coupled to the second flange 150 of the second arm portion 140. In another embodiment, one or both of the extension actuators 170 include a rotatory actuator (e.g., an electric stepper motor, a hydraulic motor, etc.) and a translator. The translator may be a rack (e.g., such that the extension actuator 170 is a rack and pinion device, etc.), a cable, a chain, a bar, etc. According to the exemplary embodiment shown in FIGS. 1-4, the extension actuators 170 are positioned externally relative to the right lift arm 110 and the left lift arm 112 and extend between the second end 124 of the first arm portion 120 and the first end 142 of the second arm portion 140. In other embodiments, the extension actuators 170 are positioned internally within the right lift arm 110 and the left lift arm 112 and extend between the second end 124 of the first arm portion 120 and the first end 142 of the second arm portion 140. According to an exemplary embodiment, the extension actuators 170 are positioned such that extension and retraction thereof repositions (e.g., extends, retracts, etc.) the second arm portion 140 relative to the first arm portion 120 between a retracted position, as shown in FIGS. 2 and 3, and an extended position, as shown in FIG. 4. According to an exemplary embodiment, retracting the extension actuators 170 provides increased clearance when the telescoping lift arm assembly 100 is in the stowed position and increased reach when the telescoping lift arm assembly 100 is in the working position.

In some embodiments, the extension actuators 170 are configured to extend (e.g., automatically, etc.) in response to the pivot actuators 160 pivoting the right lift arm 110 and the left lift arm 112. By way of example, the extension actuators 170 may be configured to automatically extend based on a position of the telescoping lift arm assembly 100 relative to the cab 16 and/or the frame 12. For example, the extension actuators 170 may be configured to automatically extend as the fork assembly 180 reaches a position where the fork assembly 180 becomes close to the cab 16 (e.g., an upper trailing edge thereof, an upper leading edge thereof, etc.) as the telescoping lift arm assembly 100 is pivoted between the stowed position and the working position (e.g., to prevent the fork assembly 180 from hitting the cab 16, etc.). The extension actuators 170 may thereafter be configured to automatically retract after the cab 16 (e.g., the upper trailing edge thereof, the upper leading edge thereof, etc.) is cleared to reduce the overall envelope of the refuse vehicle 10. Accordingly, the telescoping lift arm assembly 100 facilitates using smaller lift arms on vehicles with large cabs without an issue (i.e., due to the extendibility provided by the telescoping lift arm assembly 100).

As shown in FIGS. 2-4, the fork assembly 180 includes a pair of pivotal couplers, shown as fork brackets 182, and a pair of forks, shown as forks 188, coupled to the fork brackets 182. According to an exemplary embodiment, one of the fork brackets 182 is coupled to a respective one of the right lift arm 110 and the left lift arm 112. The forks 188 are rotationally fixed with the fork brackets 182 (e.g., pivotal movement of the fork brackets 182 causes the forks 188 to pivot therewith, etc.), according to an exemplary embodiment. As shown in FIGS. 2-4, each of the fork brackets 182 includes (i) a first coupling point, shown as first coupling point 184, pivotally coupled to the second end 144 of the second arm portion 140 at a third pivot point, shown as fork assembly pivot 148, and (ii) a second coupling point, shown as second coupling point 186. Each of the implement actuators 190 includes a first end, shown as first end 192, coupled to the second bracket 152 of the second arm portion 140 and an opposing second end, shown as second end 194, coupled to the second coupling point 186 of the fork brackets 182. According to an exemplary embodiment, the implement actuators 190 are positioned such that extension and retraction thereof pivots the fork brackets 182 and thereby the forks 188 about the fork assembly pivot 148 between a stowed position, as shown in FIGS. 2-4, and a working position, as shown in FIG. 1. In other embodiments, the fork assembly 180 is replaced or replaceable with a plow attachment; a quick attach assembly as disclosed in U.S. application Ser. No. 15/610,421, filed May 31, 2017, which is incorporated herein by reference in its entirety; and/or still another type of implement useable with the telescoping lift arm assembly 100.

As shown in FIG. 1, the telescoping lift arm assembly 100 is configured to engage with a container, shown as refuse container 200. By way of example, the refuse vehicle 10 may be driven up to a refuse pick-up location. The pivot actuators 160 may then be engaged to pivot the right lift arm 110 and the left lift arm 112 from the stowed position to the working position, as well as the implement actuators 190 may be engaged to pivot the forks 188 from the stowed position to the working position. The refuse container 200 may thereafter be retrieved from its storage location and brought proximate the telescoping lift arm assembly 100 or the refuse vehicle 10 may be driven up to the refuse container 200 such that the forks 188 align with fork tubes on the refuse container 200. A traditional refuse vehicle includes non-extendable lift arms and, therefore, in order to bring forks of the non-extending lift arms into engagement with fork tubes of a refuse container, the refuse vehicle has to be driven forward such that the forks are received by the fork tubes. The extendibility of the telescoping lift arm assembly 100 eliminates such a need to drive the refuse vehicle 10 forward to bring the forks 188 into engagement with the fork tubes of the refuse container 200. For example, once the fork tubes of the refuse container 200 are in alignment with the forks 188, the extension actuators 170 may be extended such that the second arm portions 140 extend from the first arm portions 120, bringing the forks 188 into engagement with the fork tubes of the refuse container 200. Engaging the forks 188 with the extension actuators 170 rather than by driving the refuse vehicle 10 forward may provide increased control, provide the ability to access refuse containers 200 in tighter spaces, and/or provide still other advantages.

The pivot actuators 160 may thereafter be engaged to lift the refuse container 200 over the cab 16. According to an exemplary embodiment, the implement actuators 190 are positioned to articulate the forks 188, where such articulation may assist in tipping refuse out of the refuse container 200 and into the hopper volume of the refuse compartment 30 through an opening in the cover 36. According to an exemplary embodiment, a door, shown as top door 38, is movably coupled along the cover 36 to seal the opening, thereby preventing refuse from escaping the refuse compartment 30 (e.g., due to wind, bumps in the road, etc.). The pivot actuators 160 may thereafter be engaged to pivot the right lift arm 110 and the left lift arm 112 to return the empty refuse container 200 to the ground. The extension actuators 170 may then be engaged to retract the forks 188 from the fork tubes of the refuse container 200 (e.g., without having to drive the refuse vehicle 10 in reverse, etc.).

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or movable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A refuse vehicle comprising:
   a chassis;
   a body coupled to the chassis; and
   a lift assembly including:
   a first lift arm including:
   a first arm portion having (i) a first pivot end pivotally coupled to the body and (ii) a first interface end;
   a second arm portion having (i) a second interface end that interfaces with the first interface end of the first arm portion and (ii) a first implement end configured to interface with an implement;
   a first coupler positioned proximate the first interface end of the first arm portion of the first lift arm; and
   a second coupler positioned proximate the second interface end of the second arm portion of the first lift arm;
   a second lift arm including:
   a third arm portion having (i) a second pivot end pivotally coupled to the body and (ii) a third interface end; and
   a fourth arm portion having (i) a fourth interface end that interfaces with the third interface end of the third arm portion and (ii) a second implement end configured to interface with the implement;
   a first actuator positioned to facilitate repositioning the second arm portion relative to the first arm portion, wherein the first actuator extends between the first coupler and the second coupler; and
   a second actuator positioned to facilitate repositioning the fourth arm portion relative to the third arm portion.

2. The refuse vehicle of claim 1, wherein the first actuator is positioned internally within the first lift arm and the second actuator is positioned internally within the second lift arm.

3. The refuse vehicle of claim 1, wherein the first actuator is positioned externally relative to the first lift arm and the second actuator is positioned externally relative to the second lift arm.

4. The refuse vehicle of claim 1, wherein the second lift arm includes a third coupler positioned proximate the third interface end of the third arm portion of the second lift arm, wherein the second lift arm includes a fourth coupler positioned proximate the fourth interface end of the fourth arm portion of the second lift arm, and wherein the second actuator extends between the third coupler and the fourth coupler.

5. The refuse vehicle of claim 1, further comprising:
   a third actuator coupled to the first arm portion of the first lift arm; and
   a fourth actuator coupled to the third arm portion of the second lift arm.

6. The refuse vehicle of claim 5, wherein the third actuator and the fourth actuator are positioned to facilitate pivoting the first lift arm and the second lift arm between a stowed position and a working position.

7. The refuse vehicle of claim 6, wherein the first actuator and the second actuator are configured to extend in response to the third actuator and the fourth actuator pivoting the first lift arm and the second lift arm between the stowed position and the working position such that the lift assembly clears a portion of the refuse vehicle.

8. The refuse vehicle of claim 1, further comprising the implement, wherein the implement is coupled to the first implement end of the second arm portion of the first lift arm and the second implement end of the fourth arm portion of the second lift arm.

9. The refuse vehicle of claim 8, wherein the implement includes at least one of a fork assembly, a quick attach assembly, or plow attachment.

10. The refuse vehicle of claim 1, wherein (i) one of the first interface end of the first arm portion of the first lift arm and the second interface end of the second arm portion of the first lift arm includes a first protrusion and (ii) the other of the first interface end of the first arm portion of the first lift arm and the second interface end of the second arm portion of the first lift arm defines a first cavity that slidably receives the first protrusion, and wherein (i) one of the third interface end of the third arm portion of the second lift arm and the fourth interface end of the fourth arm portion of the second lift arm includes a second protrusion and (ii) the other of the third interface end of the third arm portion of the second lift arm and the fourth interface end of the fourth arm portion of the second lift arm defines a second cavity that slidably receives the second protrusion.

11. The refuse vehicle of claim 1, wherein the first pivot end of the first arm portion is pivotally coupled to a first side of the body and the second pivot end of the third arm portion is pivotally coupled to an opposing second side of the body.

12. A lift assembly for a vehicle, the lift assembly comprising:
 a first lift arm including:
  a first arm portion having (i) a first pivot end and (ii) a first interface end;
  a second arm portion having (i) a second interface end that interfaces with the first interface end of the first arm portion and (ii) a first implement end;
  a first coupler positioned proximate the first interface end of the first arm portion of the first lift arm; and
  a second coupler positioned proximate the second interface end of the second arm portion of the first lift arm;
 a second lift arm including:
  a third arm portion having (i) a second pivot end and (ii) a third interface end;
  a fourth arm portion having (i) a fourth interface end that interfaces with the third interface end of the third arm portion and (ii) a second implement end;
  a third coupler positioned proximate the third interface end of the third arm portion of the second lift arm; and
  a fourth coupler positioned proximate the fourth interface end of the fourth arm portion of the second lift arm;
 a first actuator positioned to facilitate repositioning the second arm portion of the first lift arm relative to the first arm portion of the first lift arm, wherein the first actuator extends between the first coupler and the second coupler; and
 a second actuator positioned to facilitate repositioning the fourth arm portion of the second lift arm relative to the third arm portion of the second lift arm, wherein the second actuator extends between the third coupler and the fourth coupler.

13. The lift assembly of claim 12, wherein (i) one of the first interface end of the first arm portion of the first lift arm and the second interface end of the second arm portion of the first lift arm includes a first protrusion and (ii) the other of the first interface end of the first arm portion of the first lift arm and the second interface end of the second arm portion of the first lift arm defines a first cavity that slidably receives the first protrusion, and wherein (i) one of the third interface end of the third arm portion of the second lift arm and the fourth interface end of the fourth arm portion of the second lift arm includes a second protrusion and (ii) the other of the third interface end of the third arm portion of the second lift arm and the fourth interface end of the fourth arm portion of the second lift arm defines a second cavity that slidably receives the second protrusion.

14. The lift assembly of claim 12, wherein the first actuator is positioned externally relative to the first lift arm and the second actuator is positioned externally relative to the second lift arm, or wherein the first actuator is positioned internally within the first lift arm and the second actuator is positioned internally within the second lift arm.

15. The lift assembly of claim 12, further comprising:
 a third actuator coupled to the first arm portion of the first lift arm; and
 a fourth actuator coupled to the third arm portion of the second lift arm;
 wherein the third actuator and the fourth actuator are configured to facilitate pivoting the first lift arm and the second lift arm between a stowed position and a working position.

16. The lift assembly of claim 12, further comprising an implement, wherein the implement is coupled to the first implement end of the second arm portion of the first lift arm and the second implement end of the fourth arm portion of the second lift arm.

* * * * *